United States Patent [19]

Mista et al.

[11] 4,285,217

[45] Aug. 25, 1981

[54] STEERING SYSTEM FOR CONTROLLING THE OPERATION OF A KNITTING MACHINE

[75] Inventors: Kresimir Mista, Obertshausen; Hans-Jurgen Hohne, Hainburg, both of Fed. Rep. of Germany

[73] Assignee: Karl Mayer Textilmaschinenfabrik GmbH, Obertshausen, Fed. Rep. of Germany

[21] Appl. No.: 117,354

[22] Filed: Jan. 31, 1980

[30] Foreign Application Priority Data

Jun. 2, 1979 [DE] Fed. Rep. of Germany ....... 2904367

[51] Int. Cl.³ ............................................ D04B 23/04
[52] U.S. Cl. ....................................... 66/205; 66/207; 66/214
[58] Field of Search ................. 66/203, 204, 205, 207, 66/208, 214

[56] References Cited

U.S. PATENT DOCUMENTS

| 3,074,259 | 1/1963 | Bassist ................................. 66/8 X |
| 3,168,821 | 2/1965 | Ziningenberger ..................... 66/8 X |
| 3,834,193 | 9/1974 | Wilkens ................................ 66/8 X |
| 4,141,230 | 2/1979 | Kohl .................................... 66/204 |

FOREIGN PATENT DOCUMENTS

| 898944 | 12/1953 | Fed. Rep. of Germany ............ 66/8 X |
| 29221 | 9/1964 | German Democratic Rep. ........ 66/203 |

*Primary Examiner*—Ronald Feldbaum
*Attorney, Agent, or Firm*—Omri M. Behr

[57] ABSTRACT

A steering system for controlling the operation of a warp knitting machine performing the function of a conventional jacquard mechanism includes an electromechanical mechanism to maintain the steering element in one of its two possible terminal positions. The system includes a steering mechanism disposed generally above and in relatively close proximity to the guidebar drive levers of the knitting machine and is operably coupled to a plurality of steering elements which are disposed proximate the guides of the machine. Activation of the electromechanical device coupled to a predetermined programming device causes the steering elements to be maintained in one of its two stable conditions which may be synchronized with the source of machine driving power.

8 Claims, 9 Drawing Figures

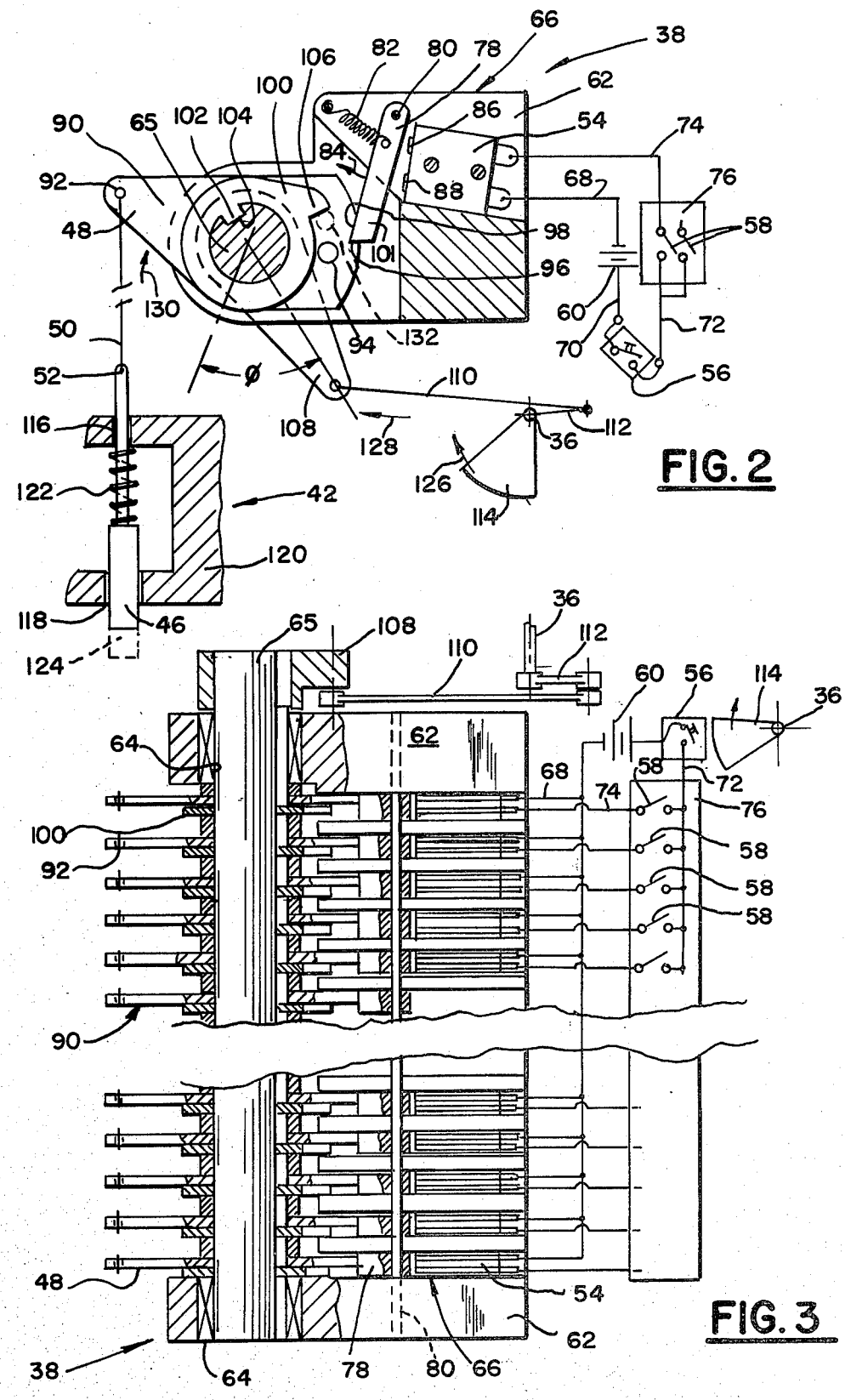

STEERING SYSTEM FOR CONTROLLING THE OPERATION OF A KNITTING MACHINE

BACKGROUND OF THE INVENTION

1. Field of the Invention

The present invention relates to knitting machines, and in particular, to an electrically controlled steering system which may replace a jacquard controlled mechanism.

2. Description of the Relevant Art

Typical jacquard control mechanisms utilize control elements which are needle formed slides disposed parallel to each other and have two stable or fixed positions. The striking surface for moving the needle formed slides is a hook disposed at one end thereof. Each slide is provided with a collar on the other end thereof which is coupled, by means of a harness string to the steerable element for example the displacement finger or steering element of a jacquard controlled warp knitting machine. A sinker hook is disposed perpendicular to the slider element. A knife edge is provided for the purpose of lifting the sinker hook during each working cycle. During this lifting movement those sinker hooks which are not to be displaced are moved to a secondary position where they cannot co-act with the knife edge. This arrangement requires synchronization of many parts and is difficult to maintain in proper alignment for long periods of time. In addition, since the parts must move over long distances, the speed of operation of the machine is severly limited.

Also, in order to reduce the strain on the harness strings which are coupled between the slider and the displacement finger the mechanism must be placed high above the warp knitting machine in order to reduce the angle of the harness strings so that they approach as close to a straight line as possible thereby avoiding the friction losses as the strings go around corners.

The present invention overcomes the shortcomings of the known devices by providing an electromagnetically controlled apparatus which may be mounted in close proximity to the knitting machine since the steering mechanism is small in size and may be mounted relatively closely to the guidebars. The harness strings may be made much shorter than heretofore known and extend in almost a straight line to the steering element which is used to deflect the individual guides. With the smaller number of components utilized in the instant invention, the machine is capable of higher rates of speed and more reliable operation.

The control element in the instant invention is rotatably positioned and is activated by a synchronized arrangement over a given working area in one direction of rotation and is caused to return over the same angle by a return spring, thereby utilizing much less volume than other known mechanisms.

The construction utilized in the instant invention does away with sinker hooks and the corresponding knife edges. The desired movement of the steerable elements is obtained solely by the rotation movement of the control element and not the lateral movement perpendicular to the slider. Each control element requires only one connection point. The dimensions of the rotatable control elments of the instant invention can be held substantially smaller than the dimentions of the needle shaped control elements and their correspondingly crossing sinker hooks. Since the bulk of the control elements are provided with a very small displacement from the axis of rotation, very small moments of force are involved, thereby permitting much higher speeds of operation. With the present apparatus it is advantageous to have the control elements biased by a spring in a conventional manner. The spring presently utilized as a return spring for the control element may again be used in the present invention, thus reducing the number of new elements required.

The steering mechanism control and the steering or deflection element may be connected by a harness string. Other means of transferring the movement of the steering mechanism to the steerable or deflecting element may be utilized by those knowledgable of the art, and it is to be considered within the scope of the present invention.

When utilizing conventional steerable elements such as displacement fingers for a plurality of guides they are normally coupled to a jacquard mechanism, via a plurality of harness strings and is desirable to provide the corresponding control elements side by side and directly above the displacement elements. This may be readily done with the present configuration. However, heretofore, the control arrangement was located in the central position of the warp knitting machine and was connected to the displacement elements by the harness strings which had to be displaced over varying angles. This required a substantial separation between the control mechanism and the displacing elements, generally in the order of about two to three meters. Otherwise, it would have been necessary to provide very sharp angles to the harness strings appearing at the ends of the machine thereby causing substantial friction and unreliability. A space of two meters above the knitting machine generally required a specially constructed building with high ceilings. Utilizing the construction as set forth in the instant invention, this space may be reduced considerably, in fact the control steering mechanism is disposed right above the knitting machine and thus, the machine may be placed in a building which has a normal ceiling height.

SUMMARY OF THE INVENTION

In a preferred embodiment of the invention, the synchronization arrangement is made rotatable about the same axis as the control element and they are located close to each other. A non-rotating synchronizing mechanism maybe provided on the same shaft that carries the control element and a lever which is connected to a drive rod that moves backwards and forwards with each rotation of the main shaft. This provides a simple drive means for the synchronization mechanism and a relatively light load for the control element. Also, it is particularly advantageous to place an activation switch for the electromagnet in series with a switch that is closable during the end of the synchronization movement and in the first part of the return movement of the shaft. A longer activation period for the electromagnet is not necessary since the anchor arm once dropped out of the detent position can no longer prevent the completion of the return movement (one of the stable positions). A second stable position is provided when the anchor arm engages the detent provided on the control element. In addition, synchronization with the main drive shaft may be provided by a cam affixed thereon which operates a switch disposed in series with the activating switch of the electromagnet.

A steering system, according to the principles of the present invention, for controlling the operation of a warp knitting machine having a needle bar, a guidebar with a plurality of guides affixed thereon, and cooperating drive levers and push rods operatively coupled to a source of driving power comprises, a steering mechanism means disposed generally above and in relatively close proximity to the guidebar drive levers, a plurality of steering element means are disposed proximate the guides and operatively coupled to the steering mechanism means. The steering element means has two stable positions. The steering element deflects the guides during stitch formation in a first position and does not deflect the guides in a second position. The first and second position of each steering element means is controlled by the steering mechanism. Additionally included is electromechanical means operatively coupled to the steering mechanism means and in synchronism with the power source for selecting the first or second position of the steering means in accordance with a predetermined program.

The foregoing and other objects and advantages will appear from the description to follow. In the description reference is made to the accompanying drawing which forms a part hereof, and in which is shown by way of illustration the specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined in the appended claims.

BRIEF DESCRIPTION OF THE DRAWING

In order that the invention may be more fully understood it will now be described by way of example with reference to the accompanying drawing in which:

FIG. 2 is a pictorial representation in elevation, of the steering mechanism and steering element showing a means of synchronization;

FIG. 3 is a pictorial representation showing a plan view, partially in section, of a steering mechanism including a plurality of steering mechanism sections;

DESCRIPTION OF THE PREFERRED EMBODIMENT

Figure 1:
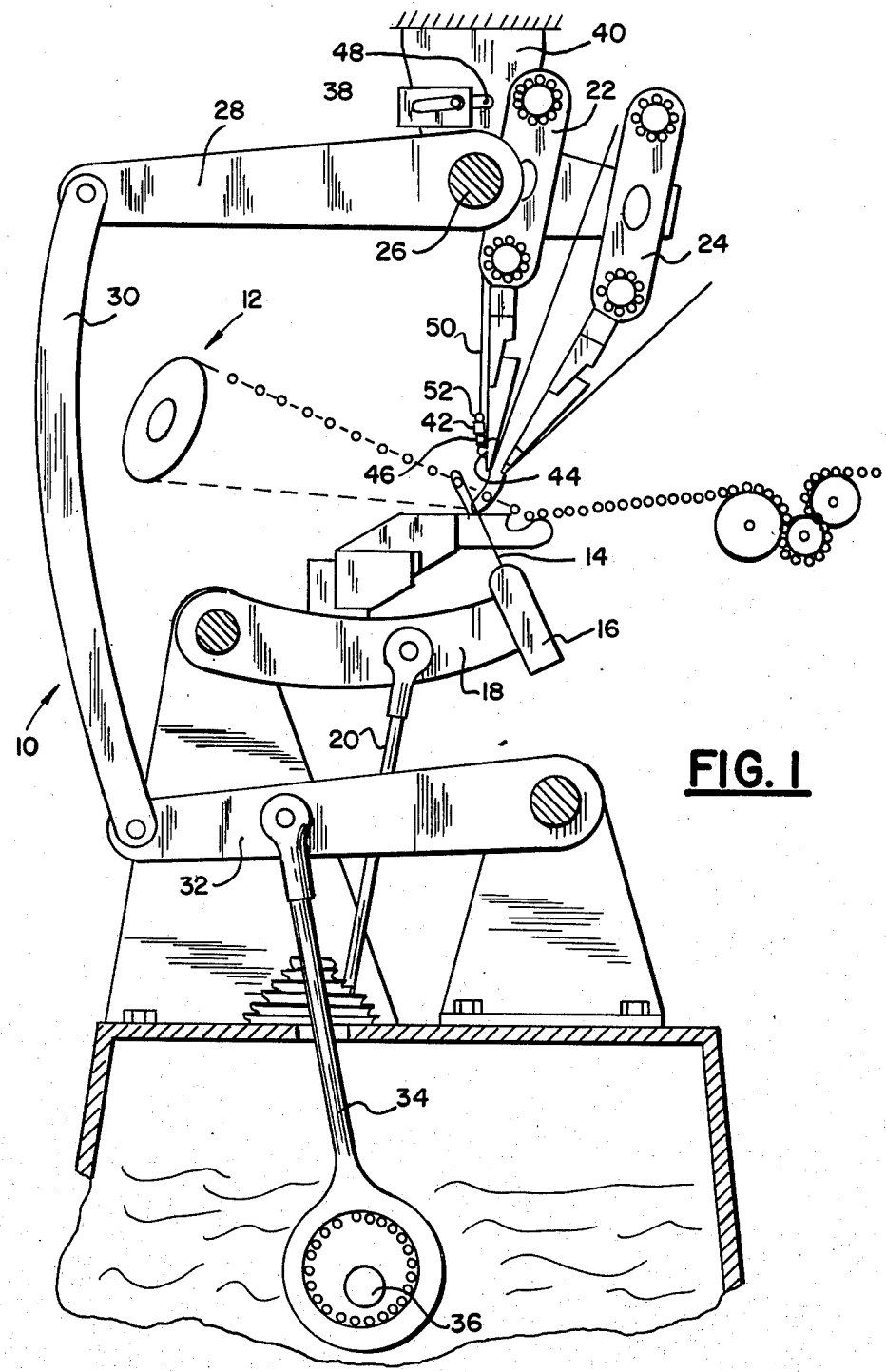
FIG. 1 is a pictorial representation, in elevation, of a warp knitting machine utilizing a steering mechanism for controlling the operation thereof, according to the principles of the present invention.

Referring now to the figures, in particular to FIG. 1, there is shown a side view in elevation of a warp knitting machine 10 with a thread carrier means 12 disposed therein. The warp knitting machine 10 includes a needle 14 carried by the needle bar 16 which is coupled to drive lever 18 by pushrod 20. The guidebars 22 and 24 are coupled to shaft 26, which is activated by drive lever 28, which in turn is activated by push lever 30. Push lever 30 is operated by drive lever 32 that is activated by drive pushrod 34. The drive pushrod 34 is coupled by means of a drive shaft 36 to the source of driving power, not shown.

A steering mechanism 38 is affixed to the frame 40 of the warp knitting machine 10 generally above and in relatively close proximity to the guidebar drive levers 28. The steering element 42 is disposed proximate the individual guides 44 affixed to the knitting machine frame 40 in a conventional manner. The deflecting finger 46 of the steering element 42 will interact with the individual guides 44 causing their deflection in accordance with the position of the control arm 48 extending from the steering mechanism 38. Control arm 48 is coupled by means of a harness cord 50 to the distal end 52 of the deflecting finger 46. A detailed explanation of the operation of the steering mechanism 38 and the steering element 42 will be forthcoming herein in conjunction with the descriptions of FIGS. 2 and 3.

Although the steering system of the instant invention is disclosed mounted on a warp knitting machine for simplicity, it is to be understood that those knowledgable in the art may readily apply this system for use on other textile machines which utilize a guidebar and associated guides capable of deflection by a device similar to the well known jacquard mechanism. The compactness and simplicity of the instant design will become more apparent as the details of construction and operation are explained.

FIG. 2 shows a pictorial representation in elevation of the steering mechanism 38 and its associated electromagnet 54 which is controlled by synchronizing switch 56 connected in series with program switch 58 and a source of energiing voltage 60. The steering mechanism 38 includes a housing 62 having a bearing 64 disposed therein (see FIG. 3), a shaft 65 and a plurality of steering mechanism sections 66. Each steering mechanism 66 includes the electromagnet 54 fixedly attached to the housing 62, in a conventional manner. The electromagnet 54 is coupled, via a lead wire 68, to a source of energizing voltage, which may be of any convenient value. Voltage 60 is serially connected to synchronizing switch 56 by means of a lead or wire 70. The other side of normally open switch 56 is connected, via a wire 72, to programming switch 58, which is also normally open. The other side of switch 58 is connected, via wire 74 to the other terminal of the electromagnet 54, thus completing a series circuit requiring both switches 56 and 58 to be closed simultaneously in order to have electromagnet 54 activated. Each steering mechanism section 66 includes its own program switch 58 while only one synchronizing switch 56 is required for the plurality of program switches 58. The wiring of these switches is more clearly shown with reference to FIG. 3. The plurality of program switches 58 is disposed in the housing 76 and may be mounted in any convenient remote location. Although the switches 58 are shown as being mechanical in nature it is understood that this switch may be of any known mechanical or electronic or semi-conductor configuration and that the mechanical switch is merely used to symbolize the closing of an electrical circuit path so that the electromagnet 54 may be activated. It is beyond the scope of the present patent to describe a program control which can sequentially activate the closing of switch 58 in accordance with a predetermined program. However, these systems are known in the art and may be readily adapted for use with the instant invention.

Anchor arm 78 is pivotally mounted on shaft 80 which extends the entire length of housing 62 and is affixed in the ends thereof. A return spring 82 has one end permanently affixed to the housing 62 with its other end affixed to anchor arm 78 thereby urging anchor arm 78 in the direction of arrow 84 away from the magnetic terminals 86 and 88 of electromagnet 54.

A generally flat elongated control element 90 is rotatably mounted on shaft 65. The control element 90 is provided proximate one end thereof with an aperture 92 adapted to receive one end of harness chord 50. Proximate the other end thereof control element 90 is provided with an axially extending studshaped engaging means 94, whose function will be explained hereinafter. The control element 90 is provided with a circumferentially inwardly disposed detent means 96 proximate the engaging means 94. A sloped surface 98 is associated with the detent means and is adapted to cooperate with the end portion 101 of anchor arm 78. The end portion 101 of anchor arm 78 is moved against the tension of spring 82 towards the terminals 86 and 88 of electromagnet 54 by the curved surface 98 when the control element 90 is caused to rotate in a clockwise direction, thus enabling electromagnet 54 to retain anchor arm 80 out of the range of engagement of detent means 96 when it is activated.

A generally disc-shaped member 100 is affixed on shaft 65 in a predetermined position by means of an internally extending tooth 102 engaging a cooperating slot 104 extending axially along the length of shaft 65. The disc-shaped member 100 is provided with a radially extending nose portion 106 which is adapted to cooperate with the stud-shaped engaging means 94 disposed on control element 90.

A lever 108 is affixed on shaft 65 and has its distal end thereof connected to a pushrod 110 which is driven, via a crank 112, from the main driving shaft 36 of the warp knitting machine. Thus, from the configuration shown it thus follows that the shaft 65 is rotated about a working angle $\phi$ backwards and forwards, by each rotation of the main shaft 36. Also affixed on drive shaft 36 is a segment-shaped cam 114 (see FIG. 2) which is used for synchronization of the steering mechanism, as will be explained hereinafter. The segement 114 is adapted to cooperate with the switch 56 and functions to close the normally open switch 56 as it comes into contact therewith.

Figure 8:
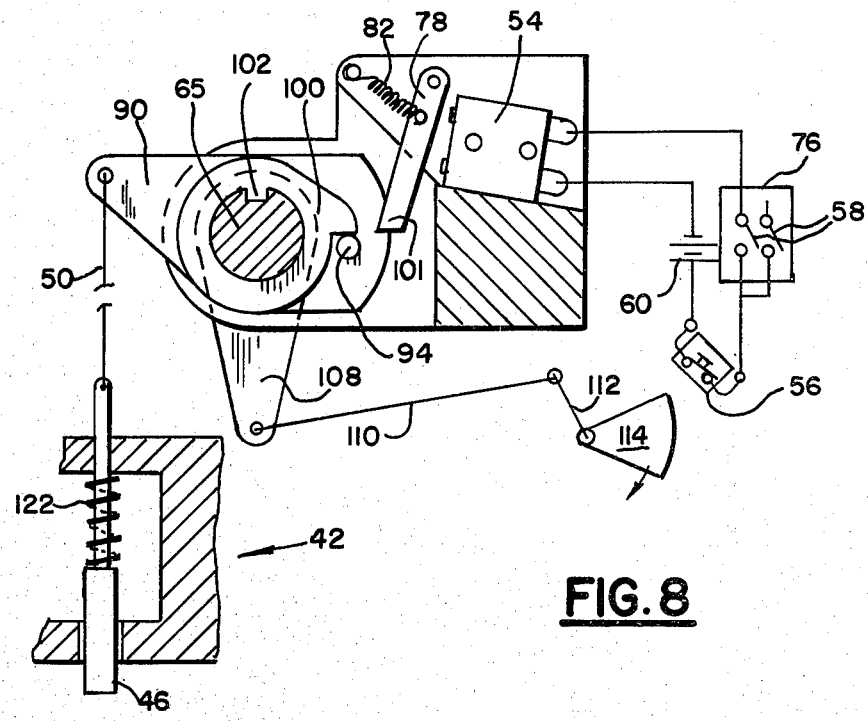
Figure 9:
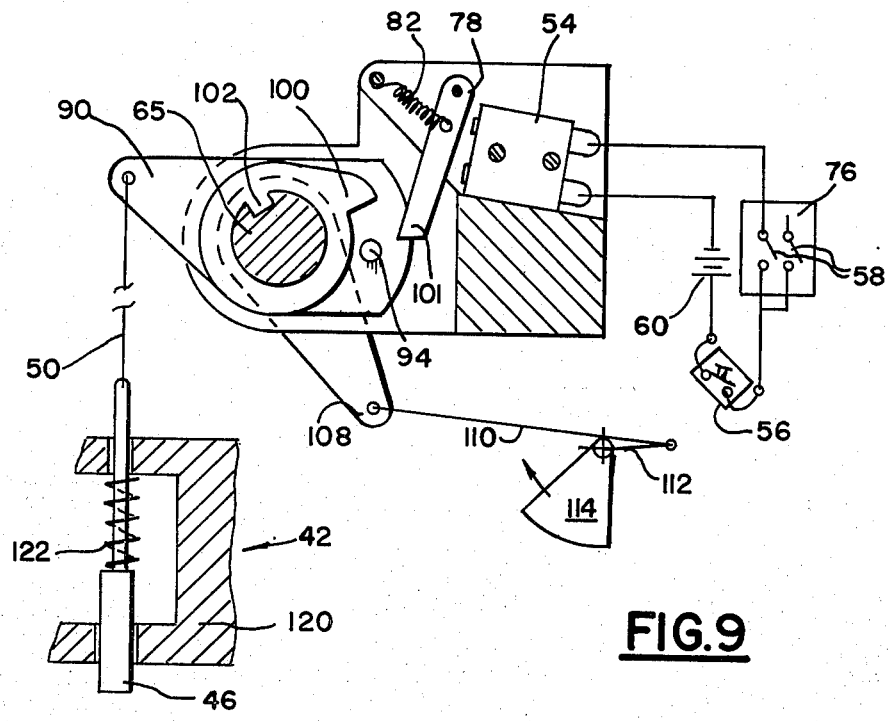

A plurality of steering elements 42 are mounted proximate the guides 44 as described earlier with regard to FIG. 1. The steering element is shown enlarged in FIG. 2 and includes a deflecting finger 46 which is adapted to receive a harness chord 50 at its distal end 52 thereof. The deflecting finger 46 freely moves in one direction in apertures 116 and 118 of support member 120. A spring 122 is internally mounted in support member 120 and cooperates with deflecting finger 46 to urge it in a downwardly direction where it extends to a stable position indicated by the dotted line 124. When deflecting finger 46 is extended to position 124 it interacts with guide 44 causing it to be deflected from its normal position. The second stable position of deflecting finger 46 is determined by the position of control element 90 when its control arm 48 is maintained in its detented position thereby causing deflecting finger 46 to be in the position as shown in FIGS. 2, 8 and 9 wherein it is out of contact with (not touching or deflecting) the guides 44.

Figure 4:
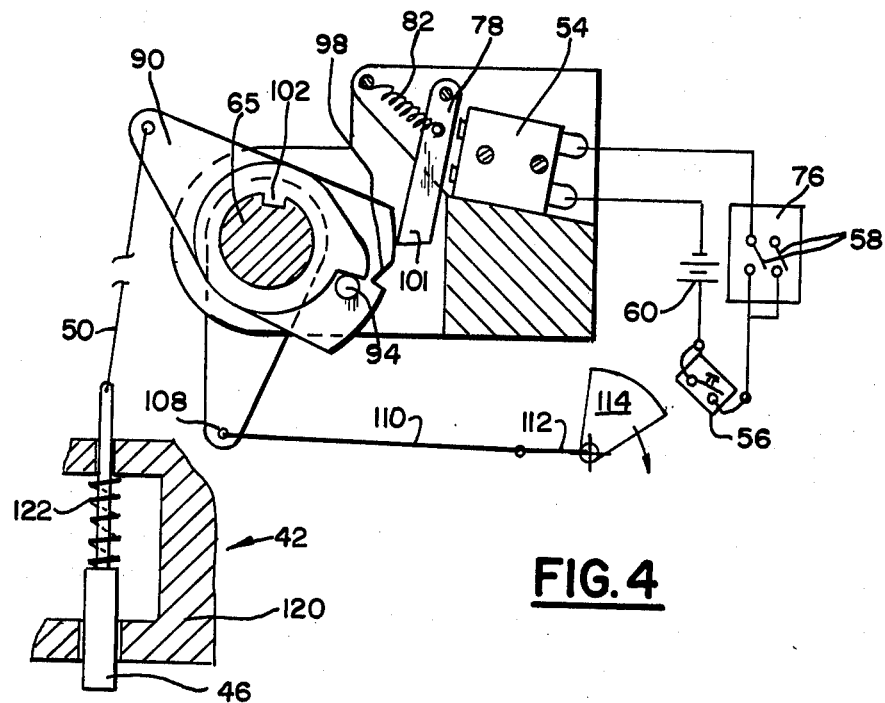
FIGS. 4, 5, and 6 are similar to the view shown in FIG. 2 at various stages of rotation of the main shaft with the electromagnet energized.
Figure 5:
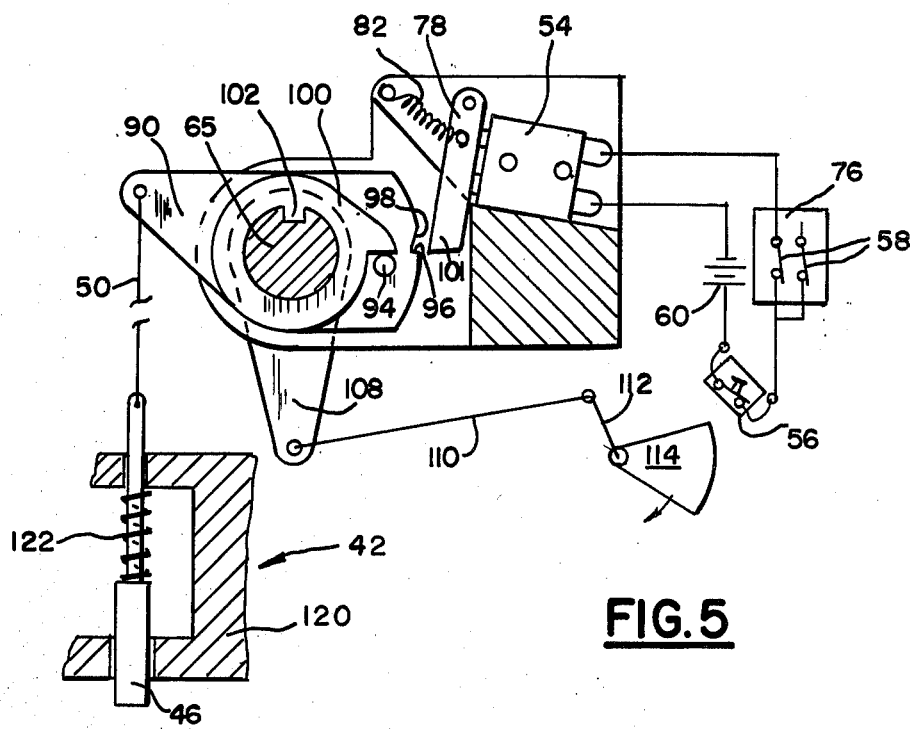
Figure 6:
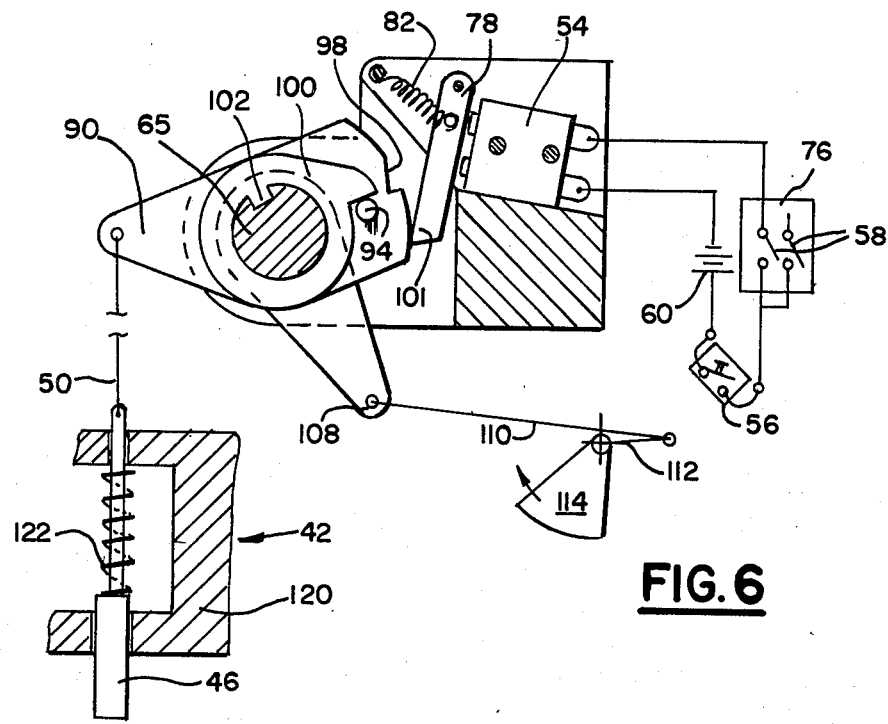

In operation, the sequencing is shown in FIGS. 4, 5 and 6 wherein the switches 58 are left in their normally open condition so that electromagnet 54 is not activated (de-energized). As segment-shaped cam 114 rotates in the direction of arrow 126 because of the rotation of the main shaft 36 it causes the pushrod 110 to move in the direction of arrow 128. As cam segment 114 comes into contact with switch 56, it thus provides for synchronization, because during the time switch 56 is closed, closing of switch 58 will permit activation of electromagnet 54. If switch 56 is not closed, activation of switch 58 cannot activate electromagnet 54.

In the mode of operation shown in FIGS. 4, 5 and 6, switch 58 is closed, therefore electromagnet 54 is energized causing the electromagnet 54 to maintain anchor arm 78 against terminals 86 and 80 overcoming the action of spring 82. The sloped surface 98 of the detent means 96 of cam 90 helps overcome the pressure of spring 82 and moves anchor arm 78 in close proximity to electromagnet 54 when it is caused to move in the direction of arrow 130 because the nose portion of disc-shaped member 100 contacts the studshaped engaging means 94 thus moving the control element 90 to its uppermost position thereby raising deflecting finger 46 to its uppermost position as shown in FIG. 4.

As shaft 36 continues to rotate, cam 115 maintains switch 56 in its closed position thereby keeping electromagnet 54 energized and maintaining anchor arm 78 against terminals 86 and 88. Anchor arm 78 is therefore removed from engagement with the detent means 96 so that as cam shaft 36 continues to rotate (refer to FIG. 5) the spring 122 continues to urge the deflecting finger 46 in a downwardly direction and it continues to do so until it is fully extended as shown in FIG. 6. Once the control element 90 has rotated sufficiently to prevent engagement of the detent 96 with anchor arm 78 permitting switch 56 to open will not effect performance as shown in FIG. 6.

Figure 7:
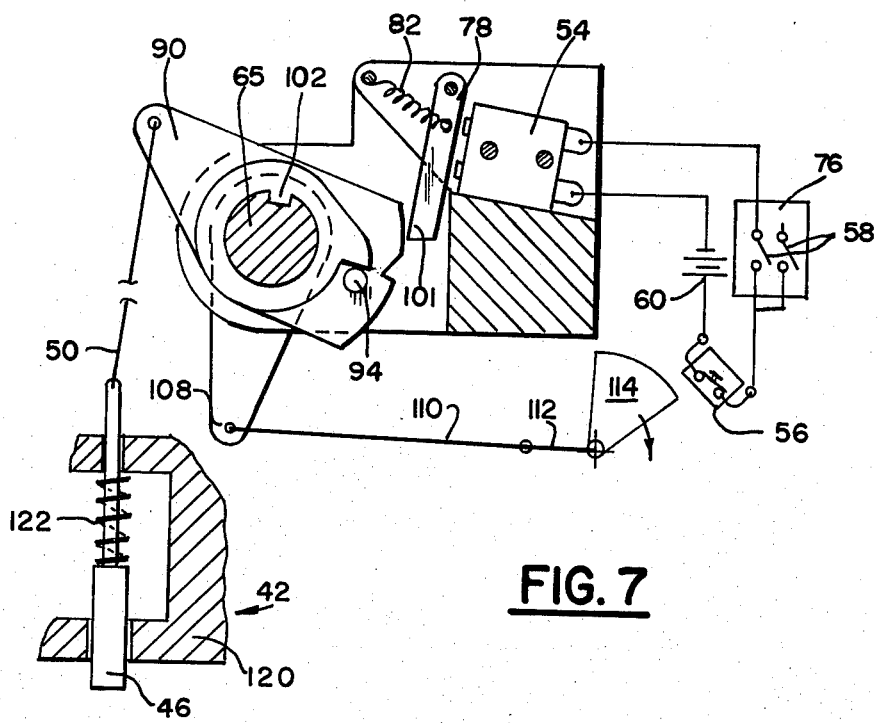
FIGS. 7, 8 and 9 are similar to the views in FIGS. 4, 5 and 6 showing the rotation of the main shaft with the electromagnet deactivated.

FIGS. 7, 8 and 9 repeat the same movement of the segment-shaped cam 114 through a complete revolution of shaft 36 however, switch 58 is maintained in an open position for the complete cycle maintaining electromagnet 54 in an unactivated (de-energized) condition so that it doesn't cooperate or co-act with anchor arm 78. The position of the components as shown in FIG. 7 is the same as that shown in FIG. 4 with electromagnet 54 de-energized. Since the electromagnet is de-energized, anchor arm 78 is urged in the direction of arrow 84 by spring 82. Thus, as control element 90 moves in a downward direction detent means 96 engages the end 101 of arm 78. When anchor arm 78 engages detent 96, control element 90 is not permitted to rotate together with shaft 65 and thus stud-shaped engaging means 94 will remain in the position as shown in FIG. 8, which is the same as the position shown in solid lines FIGS. 2, 8 and 9. The stud-shaped engaging means shown in the dotted lines 132 of FIG. 2 occurs only when the anchor arm 78 does not engage the detent means 96, as shown in FIG. 6.

At the completion of one rotation a new working cycle begins and it then becomes the function of the program switches to determine whether the guide is to be deflected or not during the formation of a stitch. The control arrangements as disclosed herein may be utilized not only on typical jacquard warp knitting machines but also may be utilized on other jacquard controlled textile machines or for machines that are used in order to punch the jacquard program cards.

Hereinbefore has been disclosed a simplified mechanism which is reliable and consumes much less volume than the well-known jacquard mechanism and is readily adapted to be used on machines which are presently controlled by this mechanism. While the present invention has been described with reference to a particular preferred embodiment thereof, it will be understood by those of ordinary skill in the art that the modifications may be made without departing from the spirit and scope of the invention.

Having thus set forth the nature of the invention, what is claimed is:

1. A steering system for controlling the operation of a warp knitting machine having a needle bar and cooperating drive levers and pushrods operatively coupled to a source of driving power comprising:
   (a) steering mechanism means disposed generally above and in relatively close proximity to said guidebar drive levers;
   (b) a plurality of steering element means disposed proximate said guides, operatively coupled to said steering mechanism means and having two stable positions, said steering element means deflecting said guides during stitch formation in a first position and not deflecting said guides in a second position, said first or said second position of each steering element means being controlled by said steering mechanism; and
   (c) electromechanical means operatively coupled to said steering mechanism means and in synchronism with said power source for selecting said first or second position of said steering means in accordance with a predetermined program.

2. A system according to claim 1 wherein said steering mechanism means includes:
   (a) a housing having bearing means disposed therein;
   (b) a shaft journaled in said bearing means; and
   (c) a plurality of steering mechanism sections disposed on said shaft.

3. A system according to claim 2 wherein each said steering mechanism section comprises:
   (a) a generally disc-shaped member affixed on said shaft in a predetermined position, said disc-shaped member being provided with a radially extending nose portion;
   (b) a control element freely rotatable on said shaft, said control element being provided with an axially extending engaging means for cooperating with said disc nose portion, a circumferential inwardly extending detent means having a shaped portion associated therewith and a lever arm portion radially extending outwardly therefrom, the distal end of said control element lever arm being operatively coupled to one of said steering element means;
   (c) anchor arm means pivotally disposed on said housing normally urged towards said disc detent means, said anchor arm means preventing further rotation of said disc means in one direction when engaging said disc detent means providing one of said stable positions of said steering element means;
   (d) electromechanical means disposed on said housing proximate said anchor arm means for retaining said anchor arm means upon activation thereof, said anchor arm means being moved into close proximity with said electromechanical means by said sloped portion of said control element detent means upon rotation thereof and out of contact with said disc detent means when retained for permitting the other of said stable positions of said steering element means to occur; and
   (e) means coupled to said electromechanical means for activating said electromechanical means according to said predetermined program.

4. A system according to claim 1 wherein each said steering element is coupled to said steering mechanism by a harness cord.

5. A system according to claim 1 wherein each said steering element means disposed proximate each of said guides comprises:
   (a) a deflecting finger having coupling means on one distal end thereof, said coupling means being operatively coupled to said steering mechanism;
   (b) frame means, deflecting finger being freely movable therein in one direction and extending therefrom in one of said stable positions for coming into deflecting contact with a cooperating guide; and
   (c) spring means cooperating with said deflecting finger for normally urging said deflecting finger to its extended position.

6. A steering mechanism for use on knitting machines having a guidebar with a plurality of guides affixed thereon and cooperating drive levers and push rods operatively coupled to a source of driving power comprising:
   (a) a housing having bearing means disposed therein;
   (b) a shaft journaled in said bearing means; and
   (c) a plurality of steering mechanism sections disposed on said shaft, each said steering mechanism section including:
      (i) a generally disc-shaped member affixed on said shaft in a predetermined position, said disc-shaped member being provided with a radially extending nose portion;
      (ii) a control element freely rotatable on said shaft, said control element being provided with an axially extending engaging means for cooperating with said disc nose portion, a circumferential inwardly extending detent means having a sloped portion associated therewith and a lever arm portion radially extending outwardly therefrom and having a coupling means disposed on the distal end of said lever arm, said control element being synchronizable with said source of driving power over a working angle in one direction of rotation to a first stable position and being selectively resetable to a second stable position;
      (iii) anchor arm means pivotally disposed on said housing normally urged towards said disc detent means said anchor arm means preventing further rotation of said disc means in one direction when engaging said disc detent means, providing said first position of said control element;
      (iiii) electromechanical means disposed on said housing proximate said anchor arm means for retaining said anchor arm means upon activation thereof, said anchor arm means being moved into close proximity with said electromechanical means by said sloped portion of said control element detent means upon rotation thereof and out of contact with said disc detent means when retained for permitting said second position of said control element to occur, and
      (iiiii) means coupled to said electromechanical means for activating said electromechanical means according to a predetermined program; and (d) a plurality of steering element means disposed proximate each of said guides, each said steering element means including:
  (i) a deflecting finger having coupling means on one distal end thereof for coupling to said control element lever arm coupling means;
  (ii) frame means, said deflecting finger being freely movable therein in one direction and extending therefrom in said second position for coming into deflecting contact with a cooperating guide; and
  (iii) spring means cooperating with said finger for normally urging said finger to its extended position.

7. A steering mechanism for use on knitting machines having a plurality of steering element means disposed proximate each of said guides, each said steering element means including a guidebar with a plurality of guides affixed thereon and cooperating drive levers and pushrods operatively coupled to a source of driving power comprising:
  (a) a housing having bearing means disposed therein;
  (b) a shaft journaled in said bearing means; and
  (c) a plurality of steering mechanism sections disposed on said shaft, each said steering mechanism section including;
    (i) a generally disc-shaped member affixed on said shaft in a predetermined position, said disc-shaped member being provided with a radially extending nose portion;
    (ii) a control element freely rotatable on said shaft, said control element being provided with an axially extending engaging means for cooperating with said disc nose portion, a circumferential inwardly extending detent means having a sloped portion associated therewith and a lever arm portion radially extending outwardly therefrom and having a coupling means disposed on the distal end of said lever arm, said control element being synchronizable with said source of driving power over a working angle in one direction of rotation to a first stable position and being selectively resetable to a second stable position;
    (iii) anchor arm means pivotally disposed on said housing normally urged towards said disc detent means said anchor arm means preventing further rotation of said disc means in one direction when engaging said disc detent means providing said first position of said control element;
    (iiii) electromechanical means disposed on said housing proximate said anchor arm means for retaining said anchor arm means upon activation thereof, said anchor arm means being moved into close proximity with said electromechanical means by said sloped portion of said control element detent means upon rotation thereof and out of contact with said disc detent means when retained for permitting said second position of said control element to occur, and
    (iiiii) means coupled to said electromechanical means for activating said electromechanical means according to a predetermined program.

8. An apparatus for selectively fixedly holding a steering element of a textile machine in one of two of its possible stable positions comprising:
  (a) a housing having bearing means disposed therein;
  (b) a shaft journaled in said bearing means; and
  (c) a steering mechanism section disposed on said shaft, each said steering mechanism section including:
    (i) a generally disc-shaped member affixed on said shaft in a predetermined position, said disc-shaped member being provided with a radially extending nose portion;
    (ii) a control element freely rotatable on said shaft, said control element being provided with an axially extending engaging means for cooperating with said disc nose portion, a circumferential inwardly extending detent means having a sloped portion associated therewith and a lever arm portion radially extending outwardly therefrom and having a coupling means disposed on the distal end of said lever arm, said control element being synchronizable with said source of driving power over a working angle in one direction of rotation to a first stable position and being selectively resetable to a second stable position;
    (iii) anchor arm means pivotally disposed on said housing normally urged towards said disc detent means said anchor arm means preventing further rotation of said disc means in one direction when engaging said disc detent means providing said first position of said control element;
    (iiii) electromechanical means disposed on said housing proximate said anchor arm means for retaining said anchor arm means upon activation thereof, said anchor arm means being moved into close proximity with said electromechanical means by said sloped portion of said control element detent means upon rotation thereof and out of contact with said disc detent means when retained for permitting said second position of said control element to occur; and
    (iiiii) means coupled to said electromechanical means for activating said electromechanical means according to a predetermined program.

* * * * *